United States Patent [19]

Wallace

[11] 4,325,985

[45] Apr. 20, 1982

[54] THREAD LOCK

[75] Inventor: Richard B. Wallace, Bloomfield Hills, Mich.

[73] Assignee: The Oakland Corporation, Troy, Mich.

[21] Appl. No.: 191,948

[22] Filed: Sep. 29, 1980

Related U.S. Application Data

[63] Continuation-in-part of Ser. No. 135,504, Mar. 31, 1980, abandoned.

[51] Int. Cl.³ .............................................. B05D 3/06
[52] U.S. Cl. .................................. 427/54.1; 10/10 R; 10/10 P; 411/258; 427/410; 427/203; 427/205
[58] Field of Search .............. 411/258; 10/10 R, 10 P; 427/54.1, 181, 203, 204, 205, 236, 239, 409, 410

[56] References Cited

U.S. PATENT DOCUMENTS 3,893,496  7/1975  Wallace et al. .................... 411/258
4,059,136  11/1977 Wallace .......................... 427/410 X
4,081,012  3/1978  Wallace .......................... 411/258
4,164,971  8/1979  Strand ............................ 10/10 P Primary Examiner—John H. Newsome
Attorney, Agent, or Firm—Whittemore, Hulbert & Belknap

[57] ABSTRACT

The method of making self-activating thread lock structures which comprises depositing a fluid material including an uncured fluid resin in the thread grooves of a threaded member; immediately thereafter, while the material is still in fluid condition, applying a thin fluid film-forming cover coat over the fluid material; and immediately thereafter transforming the cover coat into a thin, solid, dry, non-tacky, rupturable film by brief exposure to radiation, such as ultra-violet radiation.

As previously noted excellent results have been obtained using ultra-violet lamps as the source of radiation to effect substantially immediate cure of the film-forming material, but other sources are contemplated, such as electron beam radiation.

32 Claims, 4 Drawing Figures

THREAD LOCK

CROSS REFERENCE TO RELATED APPLICATION

The present invention is a continuation-in-part of my co-pending application Ser. No. 135,504, filed Mar. 31, 1980 now abandoned.

BACKGROUND AND SUMMARY OF THE INVENTION

The present invention represents a substantial improvement in quantity production of previously known friction or adhesive thread lock devices of quite different characteristics, and more specifically relates to improvements in mass production techniques adapted thereto.

The improvements reside primarily in substantial elimination of drying time required to protect fluid deposits on thread area, either permanently, or temporarily as will later appear.

According to a first aspect of the present invention, adjacent fluid deposits of a two-part adhesive, such as an uncured epoxy resin and a polymerizing agent therefor are permanently protected by a thin, dry, solid, non-tacky cover film applied immediately after deposit of the resin and activator. According to a second aspect of the present invention, a fluid resin is micro-encapsulated, or the resin and an activator therefor are both separately micro-encapsulated, the capsules mixed into a fluid binder, and the fluid binder mixture is deposited on the threads. The fluid binder is temporarily or permanently protected by a thin, dry, solid, non-tacky cover film, through which, if desired, a fluid binder component such as toluene may subsequently be eliminated by evaporation.

Reference is made to prior U.S. Pat. Nos. 3,489,599, 3,746,068 and 3,814,156, of interest herein.

First Aspect (Two part, not capsuled)

In its first aspect, the present invention is an improvement over my prior invention disclosed in my U.S. Pat. Nos. 4,059,136, issued Nov. 22, 1977, and 4,081,012 issued Mar. 28, 1978.

In these prior inventions, particularly as it was carried out in commercial production, a series of threaded articles, typically bolts, was advanced while the bolts were suspended on a horizontally moving conveyor with the axes of the bolts vertical. The bolts were heated as they advanced to about 110° F. at which time an uncured fluid resin, such as epoxy, was deposited on one side of the bolt and a fluid activator or hardener was deposited on the opposite side, and the two fluid deposits allowed to flow together. Where the two deposits met, there was an interaction resulting in curing a thin barrier film of the resin which prevented further mixing of the resin and hardener.

The next step was to apply in fluid form a cover coat of a fluid material adapted to transform into a thin rupturable protective film to protect the still-fluid deposits. The film forming fluid covering used in commercial practice was polyvinyl alcohol in a water solution. Since this covering material was required to dry sufficiently to permit removal of the bolts from the conveyor and to deposit them on a horizontally advancing belt, it was found necessary to raise the temperature of the bolts to about 135° F. before applying the film forming material. Thereafter the temperature of the bolts was raised further as they continued to advance on the conveyor while maintained with their axes vertical until they attained a temperature of about 160° F. At this time the PVA was sufficiently dried to permit the bolts to be deposited serially out of contact with each other on a flat horizontally moving belt and thereafter the bolts were maintained at a temperature of about 100° F., to complete drying of the fluid cover material to a thin, solid, dry, non-tacky protective cover film. The finished bolts could then be stored or packaged in bulk without damage.

It was further found that when the uncured resin was a clear or unfilled epoxy resin, it was too fluid if deposited at 110° or brought to this temperature after deposit, so it was necessary to increase its viscosity by adding a filler, such as nylon powder, or the like.

In practice the conveyor which advanced the bolts with their axes vertical past stations where the uncured resin and hardener and the protective cover material were applied was about twenty five feet long, and the horizontal belt on which the bolts were deposited and advanced with their axes horizontal required a length of about one hundred feet.

In accordance with the present invention, much lower temperatures are permissible with very substantial savings in energy, and in addition the space requirements of the equipment are greatly reduced. Where, as preferred, the uncured resin is epoxy, it may be applied clear at temperatures at or not much above a typical room temperature. For example, it and the hardener may be applied at 90° F., and at this temperature a suitable clear or unfilled epoxy resin has a viscosity which allows flow around the thread grooves of the bolt from one side thereof into contact with the fluid hardener at the other side of the bolt, but is not sufficiently fluid to flow downwardly across the threads away from the point of deposit to leave an insufficient quantity of material at the point of deposit.

This permits the addition of one or a mixture of powdered filler materials to the surface of the fluid resin deposit at a subsequent station where the powder is seen to be in effect drawn into the fluid resin rather than remaining as a surface deposit thereon. A further important advantage is that in this case the filler material may comprise a mixture of two or more different materials such as nylon powder, powdered glass, metal powders such as zinc, powdered graphite, table salt, and particulate material selected for imparting a desired color to the final deposit. It is difficult if not impossible to provide different particulate material to the fluid resin before deposit of the resin and to retain uniform dispersion of the particulate material through the resin, and maintain the desired proportions thereof. However, when the powders are mixed prior to application to the surface of the individual resin deposits, the powder proportions remain constant and the resin-powder proportions may be consistently controlled.

The addition of colored powder to previously deposited clear fluid resin, particularly epoxy resin, to impart a desired color to the resin deposit results in a substantial improvement in appearance and color control over the prior practice where the coloring agent was incorporated into the fluid resin, alone or with one or more particulate filler materials prior to deposit of the resin on the bolts.

In the prior practice, where the protective cover coat was polyvinyl alcohol in an aqueous solution, the final film thickness over the resin was less than that over the hardener curing agent, because of the affinity of the curing agent for water, and the water rejection of the resin. Accordingly, the application of the fluid cover coat required the use of a material whose viscosity, which controls the thickness of the deposited cover coat, catered to the worst condition. Accordingly, the protective cover film over the curing agent produced a gel as a result of invasion of water of the fluid cover solution into the curing agent.

In accordance with the improved method disclosed herein, a protective cover film is provided by applying in fluid phase a material which is transformed rapidly into a thin dry solid non-tacky protective film on exposure to ultra-violet radiation for a few seconds. This is initiated while the belt and resin and curing agent deposits are at sufficiently low temperatures to permit the deposit of clear or unfilled fluid resin at a first station, the addition of a particulate material or a mixture of different particulate materials at a second station, followed by the application of a fluid cover coat at a third station, all while the temperature of the components remains below 100° F., as for example, 90° F.

Immediately after the application of the fluid cover coat, the bolts are subjected to ultra-violet radiation for a few seconds, which cures the cover coat into a thin, dry, solid, non-tacky film, while the fluid resin and curing agent therefor remain separated and fluid. Since the film-forming fluid material is transformed in a few seconds to the solid protective film, this film is of substantially uniform thickness over the resin and curing agent.

In a particular successful operation, the resin employed was clear or unfilled epoxy, the curing agent was a fluid aliphatic amine, and the protective material was an alcohol solution of an ultra-violet sensitive, film-forming material to be described below.

Second Aspect (capsules)

According to the second aspect of the present invention, the friction or adhesive locking material is a micro-encapsulated, uncured fluid resin and is adapted to be polymerized to form a solid which provides the thread locking action when the capsules are ruptured by threading the article with a mating article.

In one embodiment of this aspect of the invention, the locking material is an uncured resin contained in a fluid anaerobic mixture and the resin is maintained in its fluid unpolymerized condition so long as the mixture is exposed to oxygen as present in ambient atmosphere. Micro-capsules containing the mixture are air-permeable so that the mixture remains fluid in the capsules. The capsules are positioned on a thread surface in such a way that a plurality of micro-capsules are ruptured when the article having a thread surface bearing the micro-capsules is threadedly engaged with a mating threaded article. The anaerobic fluid locking mixture is at least partly retained between mating thread surfaces in such a way that air is excluded, with the result that the resin polymerizes and opposes disengagement between the threaded articles.

A known practice has been to apply this anaerobic fluid directly to a threaded area at the time of use. The requirement for applying the fluid material to individual threaded articles at the time of assembly with mating articles has prevented substantial commercial acceptance of this procedure in large scale commercial production application.

As an alternative to application of the fluid material on individual threaded articles at the time of assembly, it has been proposed to mix the micro-capsules containing the anaerobic mixture with a temporarily fluid binder to produce a fluid material suitable for deposition on a thread area, in which the material will be received mainly in the thread grooves. The binder contains a fluid or liquid solvent which evaporates slowly to convert the binder to a dry, solid, non-tacky material which retains the micro-capsules in position on the thread area, while allowing adequate exposure of the capsules to air to prevent polymerization of the resin.

In a second embodiment of this aspect of the invention, a locking material is provided in the form of a fluid uncured resin adapted to solidify or polymerize when mixed with a hardener.

In this case the uncured resin is micro-encapsulated. The hardener may be separately micro-encapsulated, or it may be mixed directly into a temporarily fluid binder. The capsules containing the uncured resin and the hardener (if encapsulated) are mixed into the binder, and this mixture applied to a threaded area.

The binder is then dried, as by evaporation of a fluid or liquid component, typically toluene, and becomes a dry, solid, non-tacky material which supports the capsules on the thread area until use.

When the article containing the capsules is threadedly engaged with a mating threaded member, some of the capsules containing the fluid resin are ruptured. This fluid resin is thus exposed to hardener provided in the solidified binder or in separate micro-capsules, and is caused to polymerize to form a solid resin between opposed thread surfaces which establishes a bond or frictionally opposes relative movement therebetween.

Mass production of these threaded articles in which at least the uncured resin is contained in micro-capsules, requires that the treated articles be prevented from sticking together until the binder has dried. In practice the articles, such as bolts, are advanced on horizontally moving conveyors past an applicator station at which the fluid binder mixture containing the capsules is applied. Thereafter, before the articles are in condition for random agglomeration, it is necessary to dry the binder. This in the past has required lengthening the conveyor system and providing heaters to accelerate the evaporation of the fluid component of the binder.

The present invention as it relates to both embodiments where the uncured resin is deposited in fluid condition on the threads, or is micro-encapsulated, comprises the application of a thin layer of a film-forming fluid material by spray heads at an adjacent station, the material being adapted when exposed to ultra-violet radiation to form a thin, solid, dry, non-tacky protective film over the fluid tacky binder. This material is applied immediately after deposit of the fluid mixture, and is immediately thereafter exposed briefly to radiation, such as U-V radiation, which results in a few seconds in the formation of the non-tacky protective film.

While this film is capable of providing essentially permanent protection, it is noted that where a fluid binder is fluid because of inclusion of a fluid or liquid component subject to evaporation, the protective film permits evaporation of this component and escape of the resulting vapor through the film. A typical component, toluene, will normally evaporate at room temperature over a period of one or two days, leaving the binder in a solid state.

-continued

| Chemical Description of Component | Parts by Weight |
| --- | --- |
| Styrene | 15 (B) |
| Hydroxethyl methacrylate | 29 (B) |
| Ethylene glycol dimethacrylate | 15 (B) |
| Dimethylaminomethacrylate | 10 (B) |
| Benzophenone | 6 (C) |
| 2. Acrylated glycidyl ether of bisphenol A | 20 (A) |
| Hexanediol diacrylate | 45 (B) |
| Trimethylolpropane triacrylate | 10 (B) |
| Vinyl acetate | 5 (B) |
| Vinyl pyrrolidone | 10 (B) |
| Diethoxyacetophenone | 5 (C) |
| Triethanolamine | 5 (C) |
| 3. Acrylate polyurethane | 15 (A) |
| Acrylated aliphatic glycidyl ether | 5 (A) |
| Tripropylene glycol diacrylate | 20 (B) |
| Trimethylolpropane triacrylate | 10 (B) |
| Vinyl pyrrolidone | 15 (B) |
| Vinyl versatate | 25 (B) |
| Chloroalkyl aryl ketone | 5 (C) |
| Amyl p-dimethylaminobenzoate | 5 (C) |

Excellent results have been achieved using the following composition for the UV curable cover film:

| | |
| --- | --- |
| Urethane Acrylate | 600 (A) |
| Acrylated aliphatic glycidal ether | 200 (A) |
| Tetra ethylene glycol diacrylate | 700 (B) |
| Trimethylolpropane triacrylate | 450 (B) |
| Vinyl pyrrolidone | 600 (B) |
| Vinyl versatate | 750 (B) |
| Photo blend | 300 (C) |
| Vinyl acetate | 50 (B) | where the photo blend is composed of equal parts by weight of chloroalkyl aryl ketone, amyl p-dimethylaminobenzoate, and vinyl versatate.

In the foregoing the capital letters in parentheses following each component represents the appropriate category as described in the material preceding the tabulations.

Described in more general terms the invention comprises the steps of depositing in the thread grooves of a bolt at circumferentially spaced stations a fluid resin and a fluid curing agent therefor, applying a very thin fluid coating of an ultra-violet settable film-forming material over both of said deposits, and thereafter initiating a brief high-intensity radiation of the fluid coating to transform into a thin continuous solid non-tacky, preferably transparent, protective film which covers the still-fluid deposits in the thread grooves of the bolt. Preferably the above described steps are taken while the bolt is supported with its axis vertical. The fluid resin which is preferably an epoxy resin, has a viscosity at room temperature and up to about 100° F. such that the deposit will flow circumferentially along the thread grooves but will not flow downwardly across threads in any substantial quantity. Accordingly the resin will remain the axially located zone of deposition and the fluid resin deposit will flow circumferentially into contact with the circumferentially adjacent deposit of the fluid curing agent. Any filler or other additives desired in the finished product are applied in powder form to the surface of the fluid resin deposit and in some cases to the deposit of the fluid curing agent. The temperature of the bolt and deposits is maintained between room temperature and 100° F.

Up to the initiation of the exposure to radiation, preferably the temperature of the bolt is brought to about 90° F. at the time of the deposition of the resin and curing agent.

The duration of the ultra-violet radiation is a very few seconds as for example less than ten seconds and preferably between two and five seconds.

Where substantial amounts of particulate material have been incorporated into the resin, its viscosity is increased so that even without the protective film, no undesirable migration of the deposit would take place.

Second Aspect

In the foregoing, a specific exercise of the present invention has been described, in which an uncured fluid resin and a fluid activator effective to initiate polymerization of the resin are deposited on a thread zone in side by side relation, and protective film-forming fluid cover material applied over the deposits.

However, the invention is applicable to mass production of threaded articles on which micro-encapsulated uncured resin is carried.

It has heretofore been suggested that thread locks be formed by suitably supporting a liquid or fluid locking material in microscopic pressure-rupturable capsules located in the thread grooves of a threaded article. The capsules are mixed into a fluid binder to produce a fluid mixture suitable for application to the threads. When the binder has dried, the threaded members may be stored without sticking together.

In prior U.S. Pat. No. 3,489,599, the capsules contain an anaerobically polymerizable composition and the material of the capsules is air permeable, so that the composition including the polymerizable monomer, remains fluid. However, when the threaded article is threaded to a companion threaded article, some of the capsules rupture and the fluid monomer is captured in air-excluding relationship between adjacent thread surfaces. This monomer polymerizes into a solid material which provides an adhesive or friction bond between the thread surfaces.

This locking operation is successful but requires either that the fluid mixture be applied in fluid form to the threaded member at the point of use just prior to assembly of mating threaded parts, or encapsulated in microscopic capsules formed of air-permeable material, which are secured to the thread surfaces by "... suitable means such as solvent adhesion, a separate coating of adhesive, electrostatic attraction, etc."

In accordance with the present invention the encapsulated monomer may be mixed with a fluid binder, such for example as a mixture including a volatile fluid adapted to dry to a solid non-tacky condition in which the threaded articles may be stored in bulk at random without sticking together. This however requires expeditious elimination of the volatile fluid from the binder.

In mass production, it is a practical requirement that the treated articles be continuously advanced on suitable conveyor means which holds them separated. Conveniently this may be accomplished by advancing bolts, for example, between parallel belts as illustrated at 12 in FIGS. 2 and 3, and applying the fluid mixture of capsules and fluid binder by brushes or the like. Before the treated articles are in condition for random agglomeration, the binder must be dried, and this has in the past required heating the treated articles as they continue to advance, and a greatly increased conveyor length. The former is wasteful of the energy required to heat the articles, and the latter is wasteful of space.

DETAILED DESCRIPTION

Figure 1:
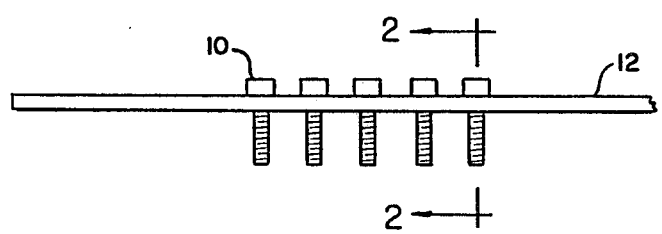
FIG. 1 is a side elevation of the twin belt conveyor.

The drawing illustrates a procedure applicable to both aspects of the invention.

First Aspect

Reference is first made to the drawing as illustrative of a procedure in accordance with the first aspect of the invention, where the uncured resin remains fluid, and is protected until use only by the protective film.

Figure 2:
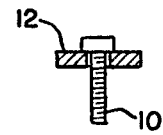
FIG. 2 is a fragmentary sectional view on the line 2—2, FIG. 1.
Figure 3:
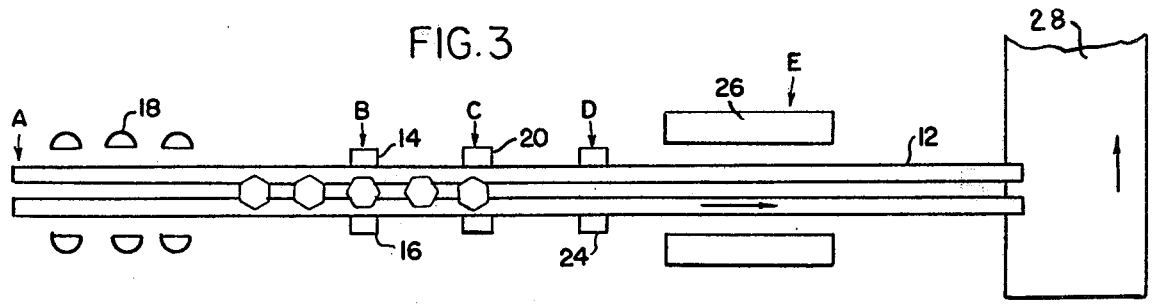
FIG. 3 is a diagrammatical plan view of the apparatus.

In the drawing a series of bolts 10 are applied to a conveyor system comprising a pair of belts 12, between which the bolts are suspended by their heads, as best seen in FIG. 2. The complete system is diagrammatically shown in FIG. 3. The conveyor belts 10 are moving in the direction of the arrow, and the individual bolts are supplied at a loading station A. At this loading station the bolts are at ambient temperature, which may be assumed to be about 70° F. In practice, the bolts may be supported with their heads in contact.

Preferably the temperature of the bolts is raised between stations A and B to about 90°. This may be accomplished by electric heaters as indicated at 18.

At B applicators 14 and 16 are provided at opposite sides of the advancing array of belts, for depositing controlled amounts of the uncured fluid epoxy resin and a fluid aliphatic amine curing agent. Applicators 14 and 16 may be of any suitable known type, and may for example be of the type disclosed in my prior above identified patents. The fluid resin and curing agent have a viscosity such that they flow along the thread grooves into contact with each other, but remain essentially at the axially located zone of deposition, which may extend for two or three threads along the bolt.

Figure 4:
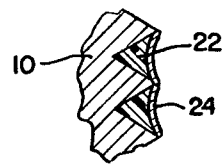
FIG. 4 is an enlarged fragmentary view of a portion of a bolt showing the deposited material and the protective film thereover.

The bolts advance from station B to stations C and D without substantial change in temperature, which may be maintained if required by additional heaters (not shown). At station C any desired additives are applied, such as nylon particles, color particles, graphite or glass powder, crystals of ordinary table salt, powdered metals, particularly zinc, or mixtures of any of these in selected amounts. The particles are applied to the surfaces of the resin deposits by applicators 20, and if desired may also be applied to the surfaces of the deposits of curing agents. As before noted, the particles appear to be drawn into the fluid deposits, and leave the surfaces thereof smooth and concavely curved as shown in FIG. 4 at 22.

Immediately after deposition of the particulate matter, if such is desired, the bolts advance to station D, where a thin application of fluid film-forming material is made, as for example by spraying from heads 24, located at both sides of the twin belts 12, shaped to direct the spray substantially uniformly over the resin and curing agents deposits. The thin film formed thereby is illustrated at 24 in FIG. 4.

The film-forming material is immediately exposed to strong ultra-violet radiation at station E. The source of radiation is elongated UV radiating tubes 26, backed by reflectors, and positioned at both sides of the array of bolts 10, and below the twin belts 12. The ultra-violet light sources used are 8–12" tubes rated at 200 watts per inch. The rate of advance of the belts is such that the individual bolts are exposed to the radiation for only a few seconds, which is sufficient to convert the surface coatings to extremely thin, solid, dry, non-tacky, protective cover films.

It is noted that the ultra-violet radiation is effective to raise the temperature of the bolts or the deposits thereon to about 130° F., which is desirable, since it promotes the elimination of any remaining solvent from the deposits.

Reference in the foregoing has been to ultra-violet radiation as the radiation which converts the thin liquid film to a solid, dry, non-tacky protective film in the few seconds which the film-forming material is subjected to the radiation. While at present ultra-violet radiation is preferred because of convenience, ready availability, and economy, other types of radiation may be employed, such for example as electron beam radiation.

The films 24 are produced by ultra-violet radiation on extremely thin (0.0005–0.0015 inches) coatings of film forming material.

In general, UV curing coating compositions are initiated by a photochemical reaction. In general they are made up from an oligomeric resin (A), one or more monomers (B) and a photoinitiator system (C). In some coatings other types of coatings additives may also be included such as flow modifiers or sufactants, pigments, flame retardants, adhesion aids, stabilizers, gloss enhancers, flatting agents or others.

The oligomeric resins (A) which can be used are frequently liquids or readily liquefiable. They include alkyd resins, unsaturated polyester resins, unsaturated polyether resins, vinyl ester resins, vinyl ether resins, acrylic ester resins, acrylic ether resins, epoxy acrylate resins, curable epoxy resins, curable phenolic resins, urethane acrylic resins or mixtures of the above.

The monomers (B) are materials which dilute or thin the coating and are also reactive to UV light to form a solid plastic. They also act as cross-linking agents. These include chemical compounds which can be classified as acrylic esters, methacrylic esters, vinyl esters, vinyl ethers, acrylic ethers, allyl esters, allyl ethers, epoxides, styrene and substituted styrenes, vinyl pyrrolidone, acrylamide and substituted acrylamides, acrylonitrile, dienes.

The photoinitiators (C) can include aromatic ketones, halogenated aromatic ketones, benzoin ethers, alkyl aryl ketones, benzil ketals, oxime esters, halogenated thioxanthones, Onium salts, fluoborates, peroxides, azo free radical generators, and promoters like tertiary amine accelerators, organometallic complexes and mixtures of the above.

The low viscosity UV curable coatings preferably have compositions in the ranges:

(A) 15–50%
(B) 80–50%
(C) 3–12%

Some examples of coatings formulations which are practical:

| Chemical Description of Component | Parts by Weight |
|---|---|
| 1. Vinyl polyesters of bishphenol A fumarate | 25 (A) |

In accordance with the present invention, the fluid mixture of micro-capsules and a fluid binder containing a volatile liquid, such as toluene, is applied serially to the articles as they pass an applicator station. This may be the Station B in FIG. 3, where the mixture may be applied at one side of the articles 10, or at both sides. In the later case, the fluid mixture may flow around the thread grooves to form a 360° ring. The fluidity however is preferably such as to prevent substantial flow axially downwardly across thread grooves.

Substantially immediately after application of the fluid mixture, a thin liquid coating of the radiation-sensitive film-forming material disclosed herein is applied as in the form of a spray, covering the still-fluid mixture. This application takes place at station D in FIG. 3.

Immediately after the application of the radiation-sensitive film-forming material, the articles traverse radiation station E, where the film-forming material is subjected to a very brief radiation treatment by ultra-violet lamps 26. This has the effect of setting the film-forming material into a dry, non-tacky film.

The film thus produced is air-permeable, so that oxygen continues to reach the micro-capsules to prevent polymerization of the encapsulated anaerobic monomer.

The film covers the deposit on the thread, so that it is non-tacky. Immediately after treatment by the ultra-violet radiation, the articles may be discharged from conveyor 12 and randomly agglomerated and collected in containers on belt 28 without sticking together. A further advantage is that the air-permeable film permits escape of the volatile component of the binder. Where this component is toluene it is found that it will have been eliminated in a day or two, at room temperature. The minor heating effect of the U-V lamps has the further useful effect of acceleration evaporation of the volatile binder component.

By the practice of the foregoing, it has been found that the equipment may be a 15 foot conveyor run at 38'/min as compared to a 100 foot conveyor run at 14'/min required in the past.

In prior U.S. Pat. No. 3,746,068 there is suggested micro-encapsulation of an unpolymerized resin, such as 1, 2-epoxy resins and mixing these capsules into a fluid binder or adhesive to produce a fluid mixture suitable for application to the threads of a threaded article. The binder includes a curing agent for the resin, and various amines are disclosed as suitable. The binders disclosed in this patent all include fluids or liquids capable of being eliminated by evaporation. In general, toluene is the preferred liquid, and this material is volatile and evaporates, but a protracted drying period usually with concurrent heating is required.

In accordance with the present invention, the fluid deposit including the micro-capsules is provided with a spray coating of film-forming, radiation-sensitive material, and immediately thereafter is subjected to the radiation from U-V lamps 26. The film forms substantially immediately and the treated articles may be placed at random in containers. Again, the volatile component of the binder escapes through the film, and the binder thus may solidify over a period of one or more days. However, no special additional handling of the treated articles is necessary after exposure to the U-V radiation.

U.S. Pat. No. 3,814,156 relates to friction locks on threaded articles, and suggests micro-encapsulation of an anaerobic monomer as the preferred adhesive of friction producing material, substantially as disclosed in U.S. Pat. No. 3,746,068, described above. It also discloses the use of a mixture of separately micro-encapsulated two part adhesives, such as an epoxy resin and an epoxy hardener, applied in fluid condition in a fluid binder, which may contain a water solution of polyvinyl alcohol, or toluene. In any case, the binder is said to "form a unified coating on the threaded fastening member after evaporation of the solvent." The invention claimed in this patent is the addition of special torque-tension control agents, but the disclosure is of micro-encapsulated materials in a fluid binder which of course requires protracted drying before the threaded products can be randomly mixed.

Thus it will be apparent that the present invention has the result of effecting major economies in energy, space, and time in large scale mass production of threaded articles provided with a patch or area of friction-producing material applied in fluid form and substantially immediately protected by a dry, solid, non-tacky film which permits correspondingly immediate random agglomeration of the articles. The locking material, or a component thereof, may remain in liquid or fluid condition and be protected only by the protective film. Alternatively, the locking material or a component thereof, may be micro-encapsulated and the capsules retained on the threads by a binder which itself is applied in fluid condition and protected by the film, either permanently, or until a liquid component of the binder has escaped by evaporation.

While a general description and examples of the ultra-violet sensitive film-forming material is set forth, it will of course be understood that any composition having the required physical properties and behavior as described herein may be employed.

Reference is made herein to the temperatures at which the deposition of lock-forming material is made, and the temperatures at which the coating of film-forming material is provided.

These temperatures are broadly defined as within normal room-temperature ranges or normal handling temperatures, to differentiate sharply from depositions at highly elevated temperatures, such as the deposition of nylon powder on thread surfaces above the melting temperature of nylon, or subsequent heating of powder deposits on thread surfaces to a temperature sufficient to melt the powder.

Specifically reference has been made to temperatures of less than 100° F., as for example 90° F. prevailing at the time of deposit of the lock-forming material on the threads, which are considered to be within a normal room temperature range.

The station B is referred to herein as the deposit station, station C as the filler station, station D as the applicator station, and station E as the radiation station.

It will be understood that where the present invention requires the use of a fluid binder, the binder material may be any of those disclosed in the prior U.S. Pat. Nos. 3,489,599, 3,746,068 or 3,814,156.

Advantages of Both Aspects

In the foregoing two separate aspects of the invention have been discussed. In one the polymerizable resin is applied in fluid form directly to the threads and a second fluid deposit of a curing agent is also provided adjacent the resin and directly on the threads. These fluid deposits are covered and protected with the radiation-curable film discussed in the foregoing.

In the second aspect of the invention, the polymerizable resin is provided in micro-encapsulated form and may be an anaerobic resin or it may be a resin which requires a curing agent to polymerize. In either case the micro-encapsulated material is applied in a fluid binder and it is this fluid binder which is protected, either temporarily or permanently, by the protective film.

Thus in both cases the protective film is applied over a fluid material, and is rapidly cured to provide a thin, dry, non-tacky protective film which permits the threaded bolts to be randomly accumulated immediately after the cure of the protective film.

In mass production of the articles, an essential feature is the continuous movement of a succession of articles through closely adjacent station to apply the fluid deposit, to apply the film-forming coating, and to expose the coating to U-V radiation, at which time the articles are completed, all without the necessity of and substantial time delay between stations, or after the U-V exposure. In a commercial practice of the invention, the overall length of the conveyor line was only fifteen feet long, and the conveyor was run at 38'/minute. Adjacent articles on the conveyor may have heads in contact so that if bolt heads are ½", the line capacity will approach 1,000 pieces per minute.

The present invention in commercial production results in a saving in overall power consumption of about 60%. In addition, the process avoids the high temperatures required in some prior methods. The present method permits a better control of addition of additives to the resin, and an improvement in the appearance of the final product. A very important advantage of the present process is that it requires a conveyor whose length is only a small fraction of that required for conveyors and belts in prior production equipment.

I claim:

1. The method of producing an externally threaded article provided with thread locking means adapted to oppose separation from a mating threaded article, which comprises depositing a fluid lock-forming material on a threaded surface of the article to cause the fluid material to be received in thread grooves and to fill the bottoms of the thread grooves, the fluid material comprising an uncured fluid resin capable of polymerization to a solid state acting between confronting thread surfaces of a threadedly engaged mating article, applying a light coating of a fluid radiation-curable film-forming material over the deposit and subjecting the coating to radiation for a few seconds to cure the coating to a thin, dry, solid, non-tacky protective film over the still-fluid deposit to permit random association of the article with like articles without sticking together.

2. The method of mass-producing articles by the method defined in claim 1, which comprises advancing a series of articles horizontally continuously in closely spaced relation through closely adjacent stations for depositing the fluid lock-forming material, applying the film-forming coating, and exposing the coating to U-V radiation, after which the completed articles are immediately suitable for random accumulation.

3. The method as defined in claim 1, which comprises depositing the fluid material on the threaded surface and applying the film-forming material over the fluid deposit with all at temperatures within normal room temperature range.

4. The method as defined in claim 1, which comprises exposing the fluid film forming material to U-V radiation of an intensity and for a duration sufficient to cure the film-forming material to a thin, solid, dry, non-tacky protective film.

5. The method of mass-producing articles by the method defined in claim 4, which comprises continuously advancing a series of articles through a deposit station and depositing the fluid lock-forming material on the threaded surfaces as the articles advance, applying the coating of film-forming material at an applicator station adjacent the deposit station as the articles continue to advance, and subjecting the coated articles to U-V radiation at a radiation station adjacent the applicator station as they continue to advance.

6. The method of mass-producing articles by the method defined in claim 5, which comprises applying the film-forming coating by spray application.

7. The method of mass-producing articles by the method defined in claim 5, which comprises collecting the finished articles at random directly after exposure to the U-V radiation.

8. The method as defined in claim 1, in which the film-forming material comprises a mixture by weight of 15–50% of an oligomeric resin, 50–80% of a monomer, and 3–12% of a photoinitiator system.

9. The method as defined in claim 7, in which the film-forming material has the composition, with components given in parts by weight:

| Components | Parts by Weight |
| --- | --- |
| Urethane Acrylate | 600 |
| Acrylated aliphatic glycidal ether | 200 |
| Tetra ethylene glycol diacrylate | 700 |
| Trimethylolpropane triacrylate | 450 |
| Vinyl pyrrolidone | 600 |
| Vinyl versatate | 750 |
| Photo blend | 300 |
| Vinyl acetate | 50 | where the photo blend is composed of equal parts by weight of chloroalkyl aryl ketone, amyl p-dimethylaminobenzoate, and vinyl versatate.

10. The method of making a friction locking bolt of the type having in the thread grooves thereof circumferentially adjacent deposits of an uncured fluid resin and a fluid curing agent therefor and a thin, non-tacky, rupturable solid protective film overlying said deposits which comprises depositing in the thread grooves of the bolt of circumferentially spaced locations a fluid resin and a fluid curing agent therefor, applying a very thin fluid coating of an ultra-violet settable film-forming material over both of said deposits, and thereafter initiating a brief high-intensity ultra-violet radiation of the fluid coating to transform the fluid coating into a thin, continuous, solid, non-tacky protective film which covers the still-fluid deposits in the thread grooves of the bolt.

11. The method as defined in claim 10, which comprises supporting the bolt with its axis vertical during deposition of the fluid resin and curing agent, application of the fluid coating and radiation thereof; in which the fluid resin has a viscosity at ambient temperatures not exceeding 100° F. which permits flow of the resin along the thread grooves into contact with the curing agent while preventing substantial flow longitudinally of the bolt; and in which the deposition of the resin and curing agent, application of the film-forming material, and initiation of the ultra-violet radiation all take place at temperatures not exceeding 100° F.

12. The method as defined in claim 11, in which the resin is an epoxy resin, and the deposit of resin and curing agent and application of the film-forming material are accomplished at about 90° F.

13. The method as defined in claim 11, which comprises applying particulate material to the surface of the fluid resin before the application of the film-forming material thereto.

14. The method as defined in claim 12, which comprises applying particulate material to the surface of the fluid resin before the application of the film-forming material thereto.

15. The method as defined in claim 13, in which the particulate material comprises one or more selected from group consisting of nylon powder, powdered glass, metal powders, powdered graphite, crystals of table salt, and powdered color-imparting material.

16. The method as defined in claim 14, in which the particulate matter comprises one or more selected from group consisting of nylon powder, powdered glass, metal powders, powdered graphite, crystals of table salt, and powdered color-imparting material.

17. The method as defined in claim 10, in which the film-forming material comprises a mixture by weight of 15-50% of an oligomeric resin, 50-80% of a monomer, and 3-12% of a photoinitiator system.

18. The method as defined in claim 17, in which the film-forming material has the composition, with components given in parts by weight:

| Components | Parts by Weight |
| --- | --- |
| Urethane Acrylate | 600 |
| Acrylated aliphatic glycidal ether | 200 |
| Tetra ethylene glycol diacrylate | 700 |
| Trimethylolpropane triacrylate | 450 |
| Vinyl pyrrolidone | 600 |
| Vinyl versatate | 750 |
| Photo blend | 300 |
| Vinyl acetate | 50 | where the photo blend is composed of equal parts by weight of chloroalkyl aryl ketone, amyl p-dimethylaminobenzoate, and vinyl versatate.

19. The method as defined in claim 11, in which the film-forming material comprises a mixture by weight of 15-50% of an oligomeric resin, 50-80% of a monomer, and 3-12% of a photoinitiator system.

20. The method as defined in claim 19, in which the film-forming material has the composition, with components given in parts by weight:

| Components | Parts by Weight |
| --- | --- |
| Urethane Acrylate | 600 |
| Acrylated aliphatic glycidal ether | 200 |
| Tetra ethylene glycol diacrylate | 700 |
| Trimethylolpropane triacrylate | 450 |
| Vinyl pyrrolidone | 600 |
| Vinyl versatate | 750 |
| Photo blend | 300 |
| Vinyl acetate | 50 | where the photo blend is composed of equal parts by weight of chloroalkyl aryl ketone, amyl p-dimethylaminobenzoate, and vinyl versatate.

21. The method as defined in claim 11, which comprises suspending a series of separate bolts from an advancing conveyor, causing the bolts to traverse stations at which the resin and curing agent deposits are made, the film-forming material applied, and the ultra-violet radiation accomplished, and then removing the finished bolts serially from the conveyor.

22. The method as defined in claim 21, which comprises depositing the finished bolts at random in containers as they are removed from the conveyor.

23. The method of making friction locking bolts which comprises suspending a series of bolts from an advancing conveyor, depositing a fluid resin at one side of the bolts as they advance and depositing a fluid curing agent on the opposite side of the bolts as they advance, applying an ultra-violet curable fluid film-forming material over the deposits as the bolts further advance, and subjecting the film-forming material to intense ultra-violet radiation as the bolts further advance to form thin, continuous, solid, non-tacky protective films over the still-fluid deposits thereon.

24. The method as defined in claim 23, in which the fluid resin is an epoxy resin having a viscosity suitable for deposition in the threads of bolts having their axes vertically disposed only at temperatures between ambient temperature and about 100° F., and which comprises maintaining the bolts at the aforesaid range of temperatures during deposition of the fluid resin and curing agents, application of the film-forming agent, and initiation of the ultra-violet radiation.

25. The method of producing externally threaded articles provided with thread locking means adapted to oppose separation from a mating threaded article which comprises depositing a fluid lock-forming material on the thread surface of the articles to be received in the thread grooves and to fill the bottoms of the thread grooves, the fluid material comprising a mixture of micro-encapsulated uncured fluid resin capable of polymerization to a solid state acting between confronting thread surfaces of a threadedly engaged mating article and a fluid binder, applying a light coating of a fluid radiation-curable, film-forming material over the deposit, exposing the coating for a few seconds to radiation to cure the coating to a thin, dry, solid, non-tacky protective film over the still fluid deposit to permit random association of the articles without sticking together.

26. The method as defined in claim 25, in which the uncured resin is in a fluid anaerobic mixture, and in which the material of the capsules, and the protective film are air-permeable to prevent polymerization of the resin until escape from ruptured capsules upon threaded engagement with mating articles and resultant exclusion of air from fluid resin between confronting thread surfaces.

27. The method as defined in claim 25, in which the fluid resin is curable by a curing agent, which comprises incorporating the curing agent in the fluid binder.

28. The method as defined in claim 25, in which the fluid resin is curable by a curing agent, and in which the curing agent is a fluid which is also micro-encapsulated and which mixes with the fluid uncured resin upon rupture of some of the micro-capsules.

29. The method as defined in claim 25, in which the fluid binder contains a volatile fluid component and is adapted to solidify upon evaporation of the fluid component.

30. The method as defined in claim 25, in which the fluid binder remains fluid and protected by the said film.

31. The method as defined in claim 1, in which the uncured fluid resin is applied in fluid condition directly to the threaded surface.

32. The method as defined in claim 1, in which the uncured fluid resin is micro-encapsulated and incorporated in a fluid binder to form a fluid mixture which is applied to the threaded surface.

* * * * *